(No Model.)

W. S. RHOADS.
HAY LOADER.

No. 555,618. Patented Mar. 3, 1896.

Witnesses:
Arthur Ashley
George Morse

Inventor:
William S. Rhoads
by
Edward Weaver
Atty

UNITED STATES PATENT OFFICE.

WILLIAM SHERIDAN RHOADS, OF WEST BEAVER CREEK, MARYLAND.

HAY-LOADER.

SPECIFICATION forming part of Letters Patent No. 555,618, dated March 3, 1896.

Application filed July 19, 1895. Serial No. 556,465. (No model.)

*To all whom it may concern:*

Be it known that I, WILLIAM SHERIDAN RHOADS, a citizen of the United States, residing at West Beaver Creek, in the county of Washington and State of Maryland, have invented certain new and useful Improvements in Hay-Loaders, of which the following is a specification, reference being had therein to the accompanying drawings.

My invention relates to hay-loaders, and has for its object the direct raking of hay as left by the mowing-machine and collecting of the same and elevating it into the wagon used to transport the crop into the barn or other appropriate shelter. The means and mechanism by which I accomplish these results are hereinafter more fully described with the aid of the accompanying drawings.

Figure 1:
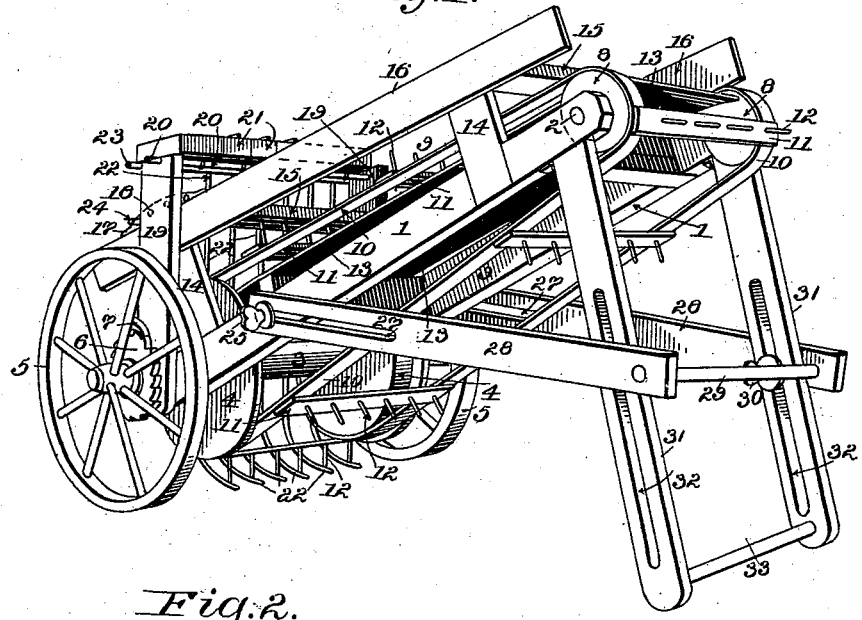
Figure 2:
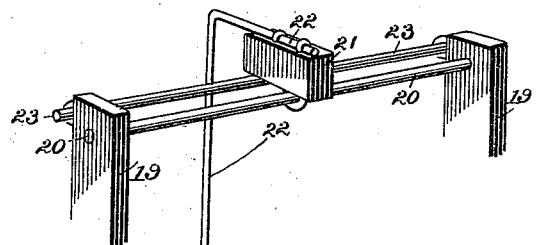
Figure 3:
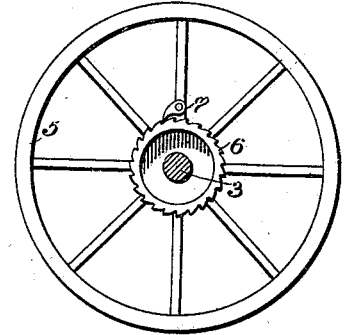
Figure 4:
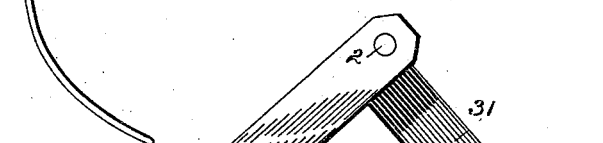

In the drawings, Figure 1 is a perspective view of the device ready to be attached to the back end of the loading wagon or rack. Fig. 2 is a detail view of the main rake-frame with a single rake-tooth mounted thereon. Fig. 3 is a detail of one of the driving-wheels, showing the coupling or clutch. Fig. 4 is a view of the elevator adjustment.

In all of the views the same numeral indicates the same part.

1 represents a rigid frame of wood having journaled at its one end a rotating shaft 2 and at its other end the axle-shaft 3, on which are mounted the fixed flanged pulleys 4 within and abutting the said frame 1, and upon the ends of which axle-shaft are loosely mounted draft-wheels 5. Fixed upon the same axle-shaft are pinion or ratchet wheels 6 abutting the said wheels 5 and engaging therewith by means of the pawl or dog 7, the use of which will be hereinafter explained. Fast mounted upon shaft 2 and rotating therewith are pulleys 8, disposed opposite the before-mentioned pulleys 4. Over these pulleys 8 and 4 is mounted an endless carrier 9, which may consist of belts 10 and transverse rake-bars 11 with straight teeth 12, as shown, or of a sprocket-chain device of a similar nature, and which it is not deemed necessary to show. Mounted upon the frame 1 and disposed immediately below the reach of the said carrier 9 is a wind shield or apron 13, the use of which will be later explained.

Uprights 14 from the frame 1 support cross-pieces 15 and longitudinal pieces 16, which latter carry vertical parallel plates 17 with a series of holes 18, said plates being disposed over the axle-shaft 3.

Journaled loosely upon the axle-shaft 3 outside of the frame 1 and inside of the pinions or ratchets 6, is an upwardly-extending frame 19, connected at the top by the round rod 20 upon which is pivotally mounted a series of adjacent tooth-blocks 21, carrying long depending rake-teeth 22, said blocks resting upon a rod 23 parallel to said rod 20. The rake-teeth 22 are of a peculiar form, being bent to resemble somewhat a scythe and forming a basket, as it were, behind the entire device to prevent scattering the hay. An adjustment of the frame 19 in its juxtaposition with the frame 1 is secured by means of rod 24 engaging holes 18 in plates 17, by which the said frame 19 is maintained in a perpendicular position.

Attached to frame 1 near axle-shaft 3 by means of an adjusting-bolt 25 in slot 27 is the draft-bar 28 by which the entire device is connected to the rear end of the loading wagon or rack. Said bars 28 are braced at their free ends by cross-piece 29 and have adjusting-bolts 30, which engage adjusting-bars 31 at slots 32, said bars 31 being hinged at their upper ends to the frame 1 and having stay-pieces 33.

I will now explain the working of my invention. The draft-bars 28 are attached to the rear end of the wagon to be loaded and the bars 31 are slipped down as far as the slots 32 over bolts 30 will permit. The rotation of the wheels 5 by the forward motion of the team will serve to rotate the ratchet-wheels 6 through the instrumentality of dogs 7, and consequently rotates the axle-shaft 3, the pulleys 4 and 8, and gives the carrier 9 an elevating travel. Whenever it happens that the wheels 5 take an opposite rotation, as would occur in the backing of the team, the dog 7 will slip the ratchet-wheel 6, and said wheel will not be reversed nor the carrier given a different direction. The rakes 22 are in the meantime collecting the fallen hay and delivering it to the carrier-rakes 12, which elevate it over the pulleys 8 into the wagon. Whenever tooth 22 strikes a rock, the piano-action of its mounting in the block 21 will permit it to rise and pass over the obstruction. As the loading proceeds, it becomes necessary to elevate the point of discharge, which is accomplished by sliding up the bars 31 and resetting the bolts 30. The rakes 22 are readjusted to the new position by shifting the rod 24 into a new set of holes in plates 17.

Having fully described my invention and its working, what is desired to be secured in my Letters Patent is—

A hay-loader, comprising a frame, drag-bars pivotally adjusted to said frame, a vertical adjusting-bar hinged to said frame and adjustably pivoted to said drag-bar, a shaft with fixed pulleys journaled in the upper end of the said frame, a main shaft journaled in the lower end of the said frame, fixed pulleys mounted upon the main shaft and an endless rake-apron traveling over said pulleys and over the before-mentioned pulleys, ratchet-wheels fixedly mounted upon said main shaft abutting and engaging by pawls the loose draft-wheels upon the ends of the said main shaft, a wind-web or shield mounted upon the before-mentioned frame inside of the endless apron, an upright frame journaled upon the said main shaft, a series of blocks pivoted in the said frame and carrying depending rake-teeth, a stop to support said blocks, and an adjusting mechanism to maintain said last frame in a vertical position, substantially as described.

In testimony whereof I affix my signature in presence of two witnesses.

WILLIAM SHERIDAN RHOADS.

Witnesses:
ALBERT HEARD,
JO. KAUSLER.